United States Patent

[11] 3,567,949

[72] Inventors James M. Forgotson, Jr.;
Ralph H. Lindley, Tulsa, Okla.
[21] Appl. No. 827,089
[22] Filed May 12, 1969
[45] Patented Mar. 2, 1971
[73] Assignee Pan American Petroleum Corporation
Tulsa, Okla.
Continuation of Ser. No. 540,055,
Apr. 4, 1966, abandoned.

[54] SYSTEM FOR CONVERTING WELL LOGS FROM ANALOGUE-TO-DIGITAL INFORMATION
14 Claims, 5 Drawing Figs.
[52] U.S. Cl............................................... 250/219,
340/15.5, 340/347
[51] Int. Cl........................................................G01n 21/30,
G01v 1/00, G08c 5/00
[50] Field of Search.......................................... 250/202,
219 IA; 340/347, 15.5

[56] References Cited
UNITED STATES PATENTS
2,881,416 4/1959 Hosken ........................ 250/219X
2,907,997 10/1959 Corwin et al. ................ 250/219X
3,209,321 9/1965 Woods .......................... 250/219X Primary Examiner—Archie R. Borchelt
Assistant Examiner—T. N. Grigsby
Attorneys—Paul F. Hawley and John D. Gassett ABSTRACT: Conventional well logs in the past have been recorded to a large extent in analogue form as a visual trace on a strip of paper. With the advent of the digital computer, it is now desired to convert these logs into digital form so that they can be processed in such modern computers. Such well logs are transferred to long strips of precision ruled, perforated paper. A drum with windows placed around its periphery is provided. Means are provided to drive these logs by these windows in a direction parallel to the axis of the drum. At the same time, scanning means are provided to scan by each window. These scanning means include means for measuring the distance between a base line and the log itself. This measurement is converted to a digital representation of the log at that point. Sufficient scanning is done to obtain digital information defining each well log.

JAMES M. FORGOTSON, JR.
RALPH H. LINDLEY
INVENTORS:

BY John D. Gassett
ATTORNEY.

JAMES M. FORGOTSON JR.
RALPH H. LINDLEY
INVENTORS:

BY John D. Gassett

ATTORNEY.

JAMES M. FORGOTSON, JR.
RALPH H. LINDLEY
INVENTORS:

BY John D. Gassett

ATTORNEY.

SYSTEM FOR CONVERTING WELL LOGS FROM ANALOGUE-TO-DIGITAL INFORMATION

This application is a continuation of Ser. No. 540,055, filed Apr. 4, 1966, and now abandoned.

The present invention relates to an analog-to-digital converter and more particularly to an apparatus for converting analogue data recorded as an amplitude varying curve such as the well known oil field well log into digital values representative of the analogue data.

Over the years in the oil and gas industry there have been literally hundreds of thousands of well logs run in boreholes drilled in the earth throughout the world. There are various types logs, such as the resistivity log, gamma ray, velocity log, etc. Normally to obtain each of such logs, an instrument is run vertically through a well bore to measure a selected parameter. The magnitude of the measured parameter is commonly recorded as a visual continuous curve varying with depth on a long narrow strip of paper, the length of the strip of paper representing the depth axis of the log. In other words, the data is recorded on the paper in analogue form. As is known in the art, it is becoming increasingly desirable to convert analogue data, including these well logs, into digital data having finite values which can be used in digital computers.

It is therefore an object of this invention to provide a novel apparatus whereby a well log curve is processed, and preferably many well logs are scanned simultaneously, to convert well log information into digital information suitable for use in modern computers.

IN accordance with our present invention, and in a preferred embodiment, the well logs are traced or otherwise transcribed as required individually on separate, long strips of precision ruled and perforated paper. The well log curve appears as a rather dark line in order to optically differentiate the curve from the remaining portion of the paper. Means are provided whereby a light beam sweeps or scans across a corresponding depth of each of the various curves in sequence. Means are provided to determine a digital representation or measurement for that portion of the sweep for each log from the time the scanning beam of light crosses the base line until it encounters the dog curve itself. The logs are advanced with respect to the beam of light so that the beam of light scans a progressively advancing position. This is repeated until the interval of interest of each log is transcribed into digital data. A digital measurement is made and recorded for each scan for each curve and thus the entire selected interval for each log curve is recorded in digital form.

In a preferred embodiment, a pulse generator or encoder is mechanically coupled to the shaft and generates spike pulses at a number that is directly proportional to the rotation of the shaft. Means are provided to count the number of pulses generated during that portion of the scanning between the light beam encountering the base line and the log curve for each log. Typically this measuring means includes an electronic gate and a circuit between the encoder and a pulse counter. The electronic gate is actuated to pass the pulses upon the base line being encountered and to reject the pulses upon the well log curve being encountered by the scanning beam of light. The counter is reset between the scanning of successive logs. The number of pulses counted for each log on each sweep then is a measure of the amplitude of the curve at the depth scanned. Thus the outputs of the counter are digital measures of the various logs being processed. These sweeps are repeated over the interval of the logs being processed at spaced points sufficiently close together to give a true digital representation of the curves.

Other objects and a better understanding of the invention, including a description of suitable means illustrating a preferred embodiment, can be had from the following description taken in conjunction with the drawings in which.

Figure 1:
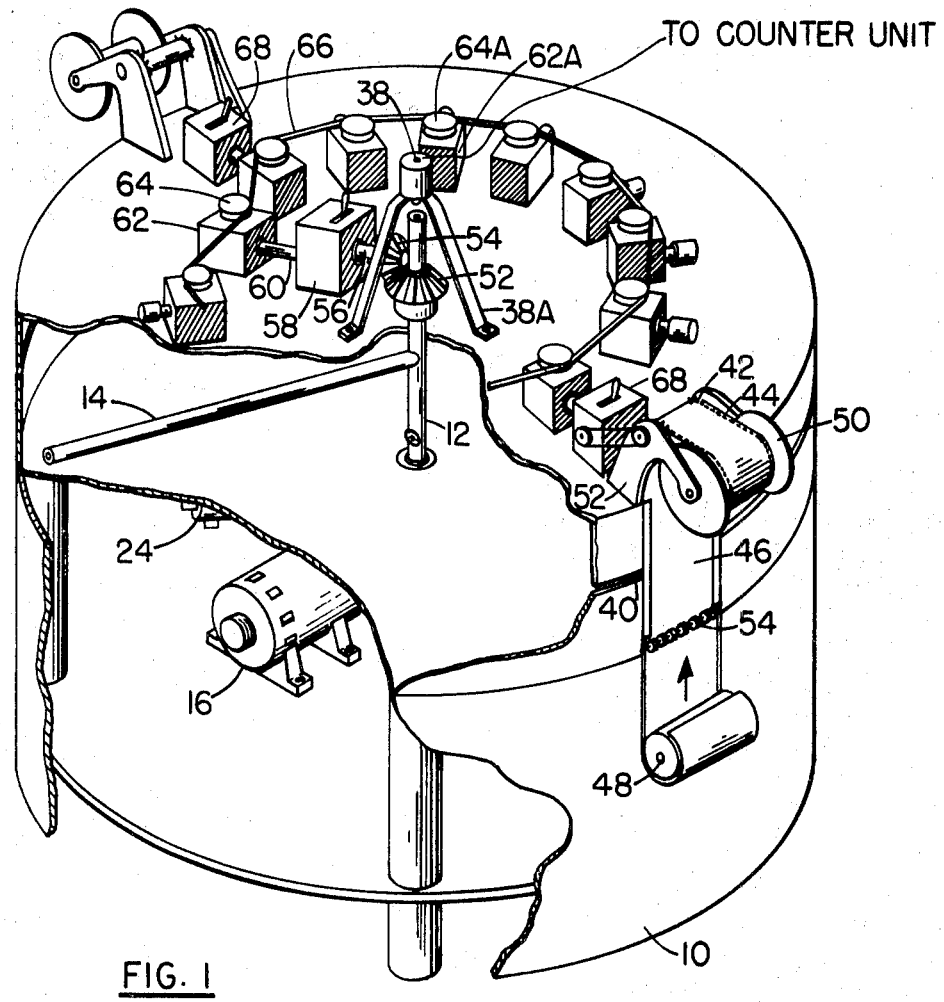
FIG. 1 is a schematic view, partly broken away, illustrating means for scanning the different logs sequentially and for advancing the increments on the logs being scanned.
Figure 2:
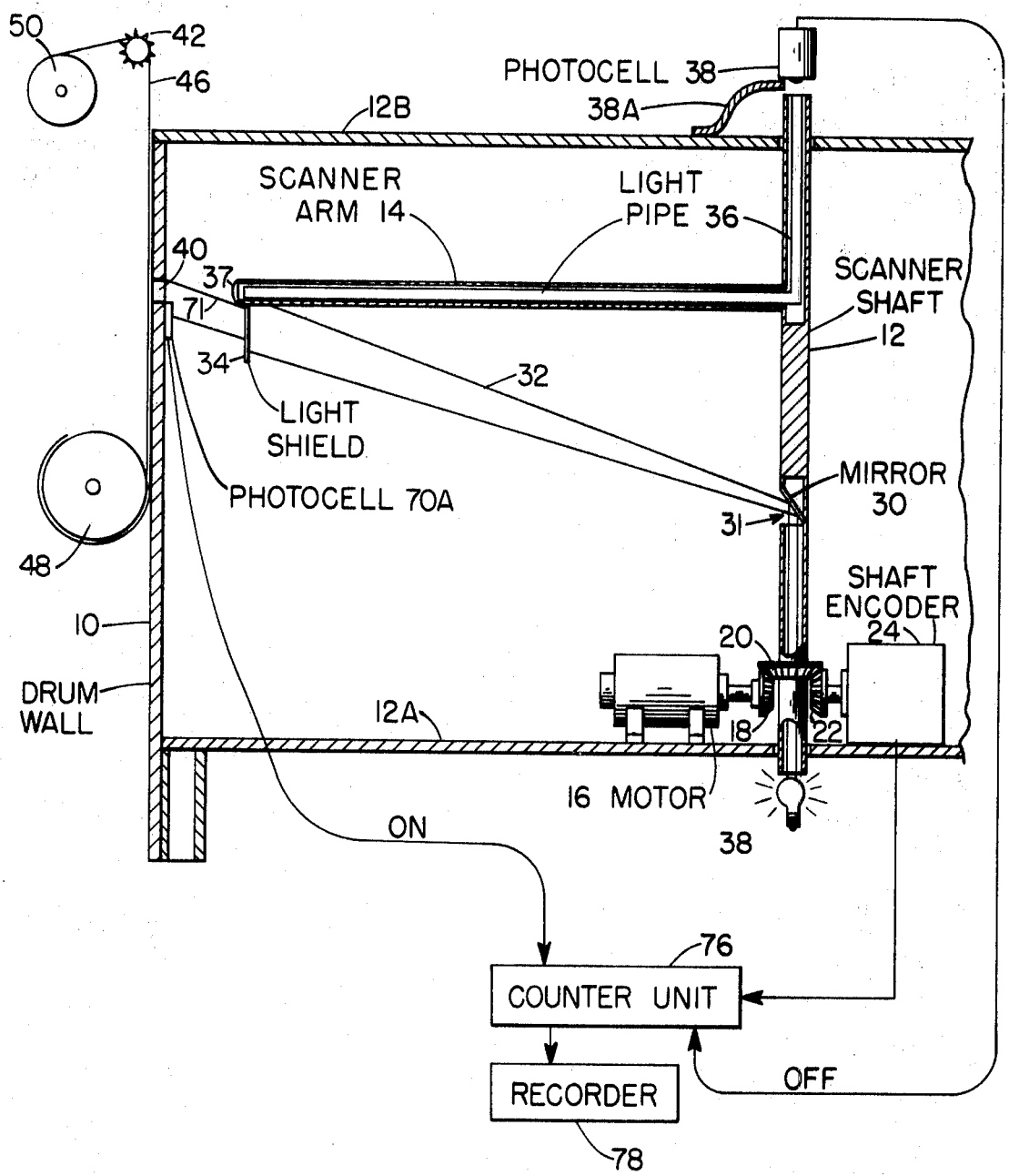
FIG. 2 is a partial section view of the apparatus of FIG. 1 taken through the scanning shaft and scanning arm.

FIG. 1 and FIG. 2 when taken together show a preferred embodiment of the invention. Shown thereon is a large vertical drum 10. Mounted axially and interior of drum 10 is a scanner shaft 12 which is provided with a scanner arm 14 which extends from shaft 12 toward drum 10. If desired, drum 10 can be made "light" tight by providing a bottom 12A and a top 12B.

Means are provided for rotating shaft 12 and scanner arm 14. This includes a motor 16 whose shaft is connected to gear 18 which drives gear 20 of scanner shaft 12. A pulse generator or shaft encoder 24 is provided and has gears 22 which mesh with gears 20 of shaft 12. Thus encoder 24 is directly mechanically coupled to shaft 12. A suitable encoder is commercially available from Auto-trol Corporation and is described as their Model 3933. Encoder 24 is a type which has a fixed number of output pulses for each fractional rotation of its shaft. As encoder 24 is mechanically coupled to shaft 12 it has a fixed number of output spikelike pulses for a selected fractional rotation of scanner shaft 12. For example, shaft encoder 24 has a fixed number of output pulses per degree of rotation of shaft 12 independent of the speed of rotation of such shaft. The importance of this is that the speed of rotation of shaft 12 can vary without affecting the accuracy of the converting process.

The wall of drum 10 is provided with a plurality of elongated narrow windows 40. These windows are provided about the wall in a plane perpendicular to shaft 12 and at the same height as scanning arm 14. The reason for this will become apparent and it is through these windows which the scanning beam of light passes. There is a window 40 provided for each log which is to be processed. The narrow dimension of each window is typically from about .1" to .25", for example. The radial dimension of each window is sufficient to accommodate the maximum amplitude of the log being processed. The only limit to this number of windows is the size of the overall converter which can be conveniently built. Typically a desirable practical number of logs to be processed simultaneously is about 15 to 20.

Attention will next be directed toward the log drive means for moving the well logs by each window 40. A log or paper drive is mounted above, and a paper supply roller means below, each window 40. The paper drive includes driven sprockets 42 which mesh with perforations 44 of log paper 46. This is to provide positive movement of the logs. A supply roller 48 is provided beneath windows 40 and a take up roller 50 is provided above the window and adjacent sprockets 42. Roller 48 is mounted from and supported by the wall of drum 10 and take up spool 50 and sprockets 42 are supported from support arms 52 which are supported by the top of drum 10. If desired, pressure rollers 54 can be provided to hold paper 46 firmly against the exterior of drum 10. Drum 10 should be sufficiently large so that the angle of curvature of windows 40 is small. This will permit paper 46 to more easily be held firmly across the window. As we mentioned earlier there can be as many paper or log drive means as desired and there will be one in conjunction with each window 40, although for simplification only two such paper drive means are illustrated in FIG. 1.

The paper log drive means are all synchronized with each other and also with the rotation of scanning arm 14. As shown in FIG. 1, this is conveniently accomplished by securing a gear 52 to the upper end of shaft 12. A driven gear 54 meshes with gear 52 and is connected to a shaft 56 which is connected to gear changer means 58. Gear changer 58 can be any of the well known means for changing an input rate of rotation to a desired output rotation rate. The output of gear changer 58 is transmitted by shaft 60 which is connected to a gear box 62. The power output of gear box 62 is connected to a sprocket 64 which drives chain 66. Chain 66 is connected to a sprocket 64A and associated gear box 62A for each paper log drive means. Movement of these chains and sprockets then control the rate at which paper strips 46 pass by window 40. The output of gear boxes 62A is connected to a gear changer 68. The purpose of gear changer 68 is to provide for different speeds of moving paper 46 by a given one of windows 40 which might be occasioned if the scale on the logs were different. It is thus seen with this arrangement that the speed of the paper 46 passing windows 40, the speed at which scanner arm 14 rotates and the rate at which encoder 24 puts out pulses are all synchronized.

Figure 3:
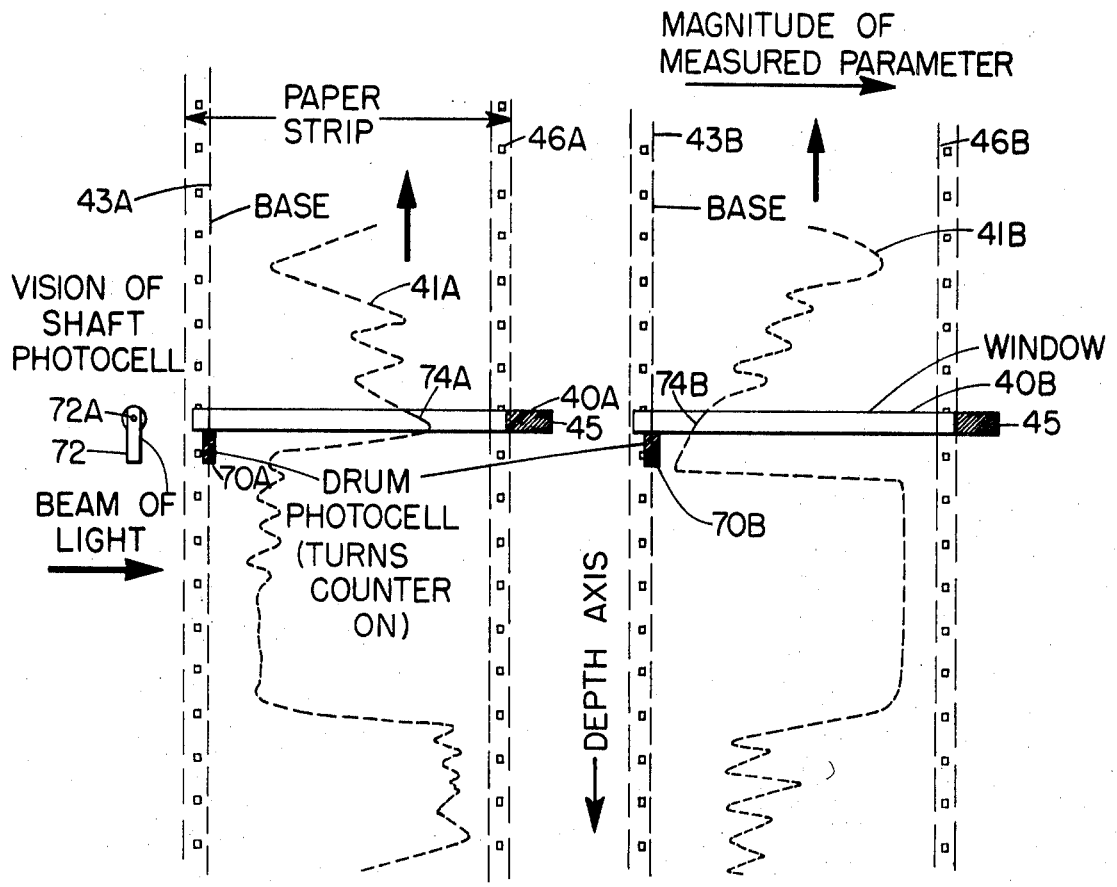
FIG. 3 illustrates two strips of paper upon which logs have been transcribed and their relationships to windows in the apparatus of FIG. 1.

Attention is next directed to FIG. 3 for an indication of the relationship of the log paper and the windows 40. Shown thereon are two strips of log paper 46A and 46B and windows 40A and 40B in the wall of drum 10. The view in FIG. 3 can be considered as being from the inside of the drum looking out and thus the log paper and log curves thereon are indicated by dotted lines. A curve 41A and a curve 41B are on paper strips 46A and 46B, respectively. These curves are normally hand-traced on perforated precision grid paper to insure accuracy. The grid is very light when compared with the log curves. These curves are of a relatively heavy dark line as can be seen on that incremental part 74A and 74B of the curves visible through windows 40A and 40B. Each curve has a base line 43A and 43B. Associated with each window 40 is a drum or window photocell 70A and 70B. The position of each photocell coincides with the position of the base line of its associated log.

As can be seen in FIG. 2, a beam 71 of light is transmitted through light shield 34 of scanner arm 14. The sectional outline of the particular beam of light illustrated in FIG. 3 is indicated by pattern 72 which is keyhole-shaped. A shaft photocell 38 is mounted above shaft 12 and as will be explained, it has a field of vision indicated as a "dot" at 72A in FIG. 3. The collecting of light for shaft photocell 38 to obtain this field of vision can be through light "pipe" 36 or by proper arrangement of lens.

The beam of light sweeps to the right as indicated, and when it strikes drum photocell 70A, that cell has an output which indicates such occurrence. This means that the base line of the log has been encountered by the scanning beam, and as will be seen tells a counter to start counting the output pulses from shaft encoder 24. When the area of vision 72A of shaft photocell 36 encounters curve segment 74A which is visible through window 40A, as will be seen, shaft photocell 38 has an output signal which signals the counter to stop counting. The count is a digital representation of the amplitude of the log curve at the level scanned in increment 74A. The rate of vertical movement of the log compared to the rate of scanning determines the spacing of the levels of successive scannings.

The source of light for light pattern 72 and the arrangement of photocell 38 will next be considered. Turning now especially to FIG. 2 there is shown a light source 28 which is below the lower end of shaft 12. Both the lower and upper portions of shaft 12 are hollow. A mirror 30 is placed in the upper portion of the lower hollow end which has an opening 31 in the direction of scanner arm 14. Light from light source 28 passes up through the lower hollow portion of shaft 12 and is reflected by mirror 30 against a light shield 34 supported at the outer end of scanner arm 14. Light shield 34 has a vertical slit therein which permits a beam of light having a cross-sectional pattern such as indicated by pattern 72 of FIG. 3. This beam is of a level so that upon rotation, a portion of it will contact photocells 70A and the upper portion will pass through window 40 to strike log paper 46.

Scanner arm 14 and the upper portion of scanner shaft 12 are hollow and in communication. Passed through these hollow portions is a light transmission means such as light pipe 36. One end of light pipe 36 is directed to receive light refracted from a circular pattern around the interior of drum 10 as the scanner arm 14 rotates. At any one instance this pattern of "vision" of scanner arm 14 has a shape as indicated by pattern 72A in FIG. 3 which is a rather small dot, e.g., .01" in diameter. As can be seen this pattern 72A "sees" a small portion of the upper end of the pattern 72 of the beam of light. Lens 37 concentrates the light refracted from the interior of the drum toward arm 14. The other end of light pipe 36 terminates opposite photocell 38 which is supported by support arm 38A above the upper end of shaft 12. Thus photocell 38 remains stationary during the entire scanning operations. Photocell 38 is of a character to have an output pulse when the light in light pipe 36 is interrupted. This light is interrupted when segment 74A of the log curve is encountered. The white background of the paper will otherwise refract light toward lens 37. Light collecting means other than light pipe 36 and scanner arm 14 can be used. Such other means can include lens and mirror arrangement to direct "vision" pattern 72A to photocell 38 through the upper hollow portion of shaft 12.

The duration or fraction of a rotation of scanner arm 14 which occurs between base 43A and curve increment 74A is identical to the time between occurrences of a pulse from photocell 70A and a pulse from a photocell 38. It is also to be recalled that the output of shaft encoder 24 is a series of pulses which occur directly proportional to the degree of rotation of shaft 12. Thus by counting the pulses from encoder 24 which occur between the time the light beam 71 encounters photocell 70A and line segment 74A, we have a measure of the digital value of segment 74A relative to the base line 43A. To obtain this value, the output of shaft encoder 24 is connected to counter unit 76. The output of photocell 70A is connected to counter unit 76 and instructs it to begin counting. The output of photocell 38 can be considered an "off" pulse and commands counter unit 76 to stop counting. A specific form of counter unit 76 will be described later in connection with FIG. 4.

As scanner arm 14 rotates, it passes by each window 40 and accompanying paper log 46. The photocell 70A accompanying each window 40A causes the counter 76 to turn on upon the beam of light reaching the base line 43A of each such log. The counter unit continues to count pulses until the light beam encounters the segment of the log within window 40A. This count gives a measure in digital form of the amplitude of each segment 74A of each log. It may sometime happen that the printing of log curve 41A is defective and will not cause an interruption of light to shaft photocell 38. Means are provided so that the photocell 38 is always caused to have an output for each window. This is accomplished by providing a light absorbing strip 45 placed at the side of the window opposite photocells 70A etc.

The logs 46 are placed upon each log drive means so that windows 40 at any one time permit a view of the same depth interval for each log. Thus for each revolution of scanner arm 14 there is obtained a digital value representing the amplitude for each log being processed for identical depths. It will be recognized that each log 46 is advancing as the scanner arm is rotating and that if all the logs are set for the same depth interval to appear at each window before scanning begins, then by the time the scanning arm reaches the latter logs, they will have advanced to a slightly different depth from that of the other logs. Ordinarily this will be no problem because the scanning is usually considerably more rapid in comparison to the vertical movement of the paper. However if this is a problem it can be solved by initially adjusting the alignment of the logs to compensate for the advancement of the logs before the scanning arm reaches them. Thus any accuracy desired can be obtained by adjusting the placing of the logs on the sprocket drives so that the same depth is exposed to the window as that particular window is swept by the beam of light.

Figure 4:
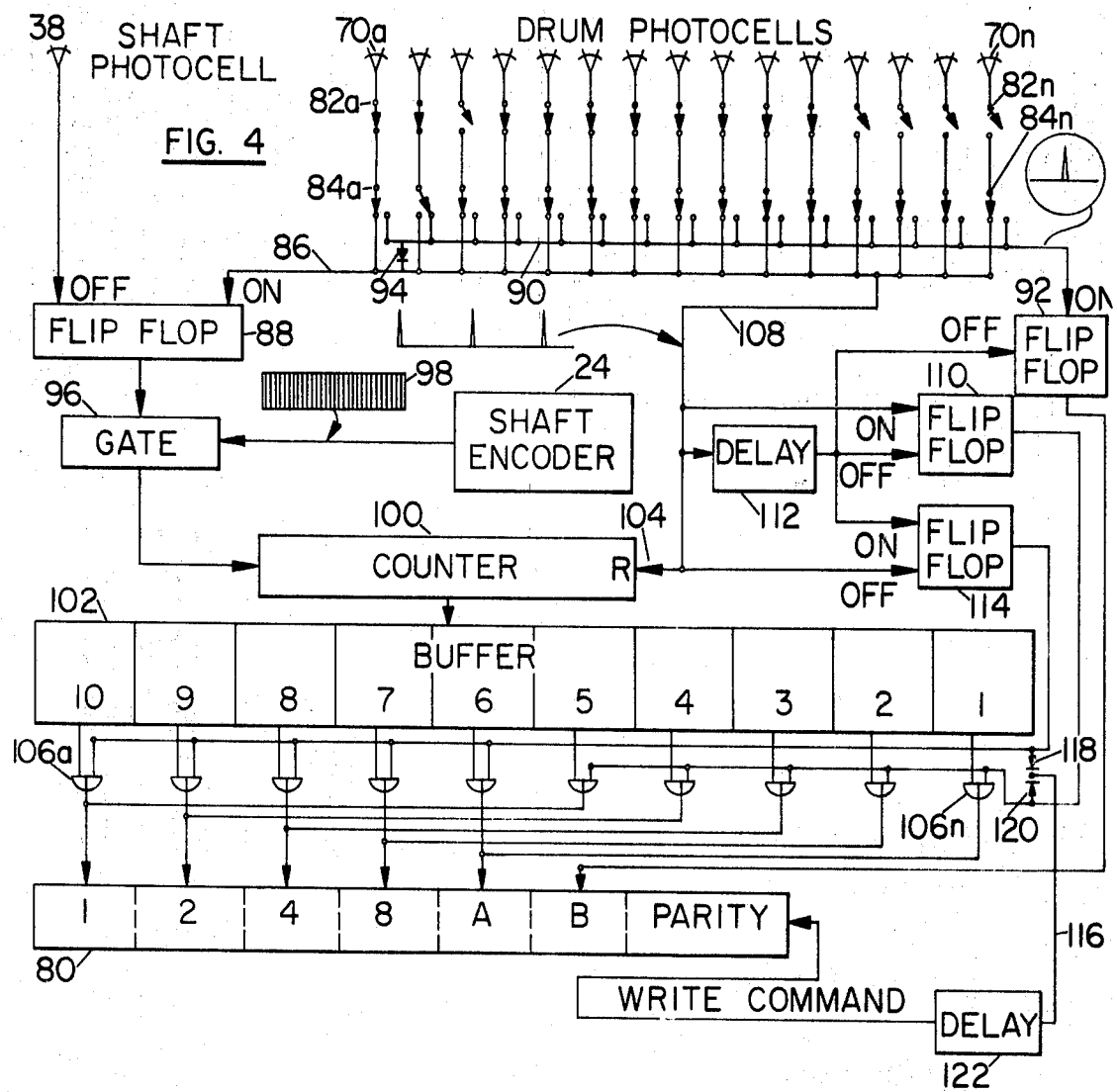
FIG. 4 illustrates in block diagram form the counting system of FIG. 2.

Attention is next directed toward FIG. 4 which shows in block diagram form one suitable electronic circuit for use in obtaining and recording the digital information. The principal parts include drum photocells 70A to 70n which turns the counter on when the scanner arm 14 reaches the base line of each log being surveyed, shaft photocell 38 whose signal stops the flow of pulses from shaft encoder to the counter when scanner arm 14 encounters a log curve; shaft encoder 24; a counter 100; a buffer 102; and a multichannel recording means 80.

Each drum window photocell 70A to 70n is connected through a first switch 82A to 82n which merely opens or closes the circuit from each photocell to the terminal of two-position switches 84A to 84n. These switches may be selectively closed to activate any desired combination of channels. When the switches 84A to 84n are in a first position they are connected to a common bus or conductor 86 which is connected to the "on" input of flip-flop 88 as well as to other elements which will be discussed. When switches 84A to 84n are in their second position, or to the position off vertical, they are connected to a second conductor 90 which is connected both to the "on" input of flip-flop 92 (the purpose of which will be discussed later) and through diode 94 to conductor 86 and which as has been mentioned, is connected to the "on" input of flip-flop 88. The "off" input of flip-flop 88 is connected to shaft photocell 38. Flip-flop 88 is of a character to have an output such as illustrated in curve C of FIG. 5. In other words when flip-flop 88 is turned on, it has an output voltage of a selected level which remains on at that level until the flip-flop is turned off. The pulses, shown in curve B, from drum photocell 70A then turn flip-flop 88 on which coincides with the scanning arm reaching the base line of each log, and the pulses, shown as curve A, from shaft photocell 38 turns the flip-flop 88 off, which is coincident with the scanner arm 14 contacting the dark curve visible through window 40. Thus it is seen that flip-flop 88 has an output signal or pulse whose duration is directly proportional to, or representative of, the amplitude of the log being processed at the level scanned.

Figure 5:
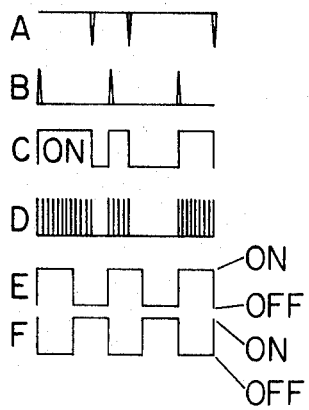
FIG. 5 illustrates wave forms useful in explaining the apparatus of FIG. 4.

The output of flip-flop 88 is connected to a gate 96 and functions to open such gate during the time that flip-flop 88 is on. Connected to the input of electronic gate 96 is the output of shaft encoder 24. As indicated at 98 this output from encoder 24 is a series of closely spaced, sharp, repeating pulses. The gate 96 passes these pulses during the time that flip-flop 88 is on. Thus the number of such spikes 98 which passes through gate 96 is a function of the amplitude of the well log being processed for the depth interval appearing at window 40. The relationship of passing pulses through gate 96 and the time during which flip-flop 88 is on is illustrated in curves D and C respectively of FIG. 5. In FIG. 5 curve B represents pulses from drum photocell 70A to 70n and as can be seen coincides with the beginning of the "on" period of flip-flop 88. Curve A of FIG. 5 illustrates a timing of the pulses from shaft photocell 38 and as can be seen coincides with the turning off of flip-flop 88.

The output of gate 96 is connected to an electronic counter 100. Counter 100 counts the pulses 98 which are passed through gate 96 in any one group and is reset to zero before or when the next group enters. Counter 100, which can be a straight binary counter, is connected to a buffer 102. This buffer is illustrated as having a ten-bit memory which is convenient for most logs. Counter 100 transfers its values to buffer 102, and resets itself to zero, upon receiving an input pulse on conduit 104. Conduit 104 is connected to bus 86 and transmits a pulse from any of the drum photocells 70A to 70n.

Each bit of buffer 102 is connected to an AND gate 106A to 106n. Each of these AND gates have two input connections, each of which is required to have an input before the AND gate has an output. The particular arrangement shown in FIG. 4 is such that a first group of bits 1 to 5 transfers their information simultaneously to channels A, 8, 4, 2, 1 of recorder 80 and a second group of bits 6, 7, 8, 9 and 10 of buffer 106A simultaneously transmit their information to these channels at alternate times from that of bits 1 to 5.

A discussion will now be had of that portion of the block diagram which ultimately transfers information from the first group of bits and the second group of bits of buffer 102 to recorder 80. The outputs of drum photocells 70A to 70n are also connected through conduit 108 to the "on" input of flip-flop 110, the input of delay 112 and the off input of flip-flop 114. The output of delay 112 is connected to the "off" input of flip-flop 92, to the off input of flip-flop 110 and to the "on" input of flip-flop 114. Delay 112 is sufficient to permit the transfer of information from one group of bits of buffer 102 to recorder 80. Typically this delay can be 2 milliseconds. The output of flip-flop 110 is connected to one of the inputs of the AND gates connected to the first group of bits 1 to 5 of buffer 102. Thus during the time that flip-flop 110 is "on," information of these bits is transferred to recorder 80. When flip-flop 114 is "on" flip-flop 110 is "off." This is illustrated in curves E and F of FIG. 5 in which curve E represents the output of flip-flop 110 and curve F represents the output of flip-flop 114. Thus, when flip-flop 110 is turned off, flip-flop 114 is turned on and its output is connected to one of the inputs of each of the AND gates associated with the second group of bits 6, 7, 8, 9 and 10 of buffer 102. During the time that this group of AND gates is enabled information on bits 6 to 10 of buffer 102 is transmitted to recorder 80. Recorder 80 receives a "write" command each time flip-flop 110 or flip-flop 114 is turned on. This is accomplished by having a conductor 116 connected through a first diode 118 to the output of flip-flop 114 and through a second diode 120 to the output of flip-flop 110. This is connected through a delay 122 to recorder 80. The output from delay 122 is a "write" command.

Attention will now be directed at means for flagging the B channel of recording medium 80 so that the computer can associate the information with the selected channel. This is conveniently done by connecting the output of flip-flop 92 to channel B of the recording medium. It will be recalled that flip-flop 92 is turned on by any selected one of the drum photocells 70A to 70n each time that particular base line is encountered during the scanning operation. Flip-flop 92 is turned off a fixed amount of time later, typically 2 milliseconds, by an output pulse from delay 112.

While the above embodiments of our invention have been described with a certain amount of detail, various modifications can be made therefrom without departing from the scope of our invention.

We claim:

1. An analogue to digital converter for use with analogue data represented on a strip of paper by a curve having different optical characteristics from the paper upon which it is placed, said curve being placed on said paper in relation to a base parallel to the depth axis, the combination which comprises:
   a drum having elongated windows, each intersecting a plane perpendicular to the axis of said drum, there being a window for each curve being processed;
   drive means for simultaneously moving each said curve past said window and in a direction parallel to the axis of said drum;
   a scanning means for sequentially scanning corresponding levels of each of said analogue data and including a light beam generating means for generating a revolving light beam which sequentially passes each said window;
   means to detect when said light beam strikes a point indicative of the base of said log curve to emit an "on" pulse and means to detect when said light beam strikes said log curve to emit an "off" pulse;
   measuring means for determining a measure of the interval between said "on" signal and said "off" signal; and
   recording means to record the output of said measuring means.

2. An apparatus as defined in claim 1 in which said light beam generating means includes:
   a shaft spaced axially within said drum, said shaft having an upper and a lower end portion hollow, and a side opening in the hollow lower end portion;
   a hollow scanning arm placed radially to said shaft, said scanning arm projecting outwardly toward the same level as said windows;

a light pipe transfer means extending from the outer end of said arm upwardly through the upper hollow portion of said shaft to its end; and a light source exterior of said drum and arranged to transmit light into the lower hollow portion to reflect light outwardly and upwardly toward said windows through said side opening in said shaft, a light shield carried at the outer end of said arm, said shield having a slot therein to permit passage of the selected shape of said light beam.

3. An apparatus as defined in claim 2 including a shaft photocell supported by said drum exterior thereof and in alignment with the upper end of said shaft whereby said photocell receives light from said light pipe to generate said "off" signal and further including a drum photocell at one end of each said windows to generate said "on" signal when struck by said light beam.

4. An apparatus as defined in claim 3 in which said measuring means includes pulse generating means whose output number of pulses is directly proportional to the rotation of said scanning arm and counting means to count the number of such pulses emitted between said "on" pulse and said "off" pulse.

5. An apparatus as defined in claim 4 in which said drive means is mechanically coupled to said scanner shaft.

6. An apparatus as defined in claim 5 wherein a light absorbing coating is provided on the interior of said drum adjacent the other end of each said window away from said drum photocell.

7. An apparatus for transcribing analogue data to digital data which comprises in combination:
   a drum having a plurality of elongated windows perpendicular to the axis of the drum, all said windows being at the same level;
   a scanner shaft axially mounted within said drum, the upper end of said scanner shaft being hollow and extending exterior of said drum, the lower end portion of said scanner shaft being hollow and having a side opening;
   a light source positioned at the lower open end of said shaft;
   a mirror in said lower hollow portion of said shaft and adjacent said side opening to reflect light from said light source outwardly toward said window;
   a hollow scanning arm perpendicularly attached to said shaft so that the outer end thereof is at the same level as said windows, the hollow interior of said scanner arm opening into the upper hollow section of said shaft;
   a light pipe extending from the outer end of said scanner arm through the hollow portion thereof and through the upper hollow portion of said scanner shaft to the open end thereof;
   a shaft photocell supported by said drum just above, but not attached to, said scanner shaft so that said photocell receives light from said light pipe;
   a window photocell placed adjacent one end of each of said windows;
   a light shield carried at the outer end of said scanner arm, said light shield having a light passing slit for passing a light beam of the desired shape therethrough;
   drive means for driving said scanner shaft;
   means for driving a strip of paper on which the analogue data is recorded past the exterior of each said window;
   means mechanically coupling said drive means to said scanner shaft;
   a shaft encoder mechanically connected to said shaft and having an output which is a plurality of sharp pulses, the number generated being constant for a given increment of rotation of said scanner shaft;
   an electronic gate means connected to the output of said encoder;
   a counter means connected to the output of said gate means;
   a recorder connected to the output of said counter means; and
   circuit means connecting each said window photocell to said gate means, a pulse from each said window photocell to cause said gate means to pass said sharp pulses and said circuit means including means connected to said shaft photocell to cause said electronic gate to not pass said sharp pulses.

8. An apparatus as defined in claim 7 including a light absorbing coating means placed adjacent the end of each said window opposite each said window photocell.

9. An analogue to digital converter for use with analogue data represented on a strip of recording medium, said curve being placed on said recording medium in relation to a base parallel to the depth axis, the combination which comprises:
   a drum having elongated windows each of which intersects a plane perpendicular to the axis of said drum, there being a window for each curve being processed;
   drive means for simultaneously driving each said curve past said window in a direction parallel to the axis of said drum;
   scanning means for sequentially scanning corresponding levels of each of said analogue data at a selected position within each said window, said scanning means scanning in a plane perpendicular to the axis of said drum, said scanning means including means for generating an "on" signal and and "off" signal each time said scanning means encounters said base and said signal curve, respectively;
   measuring means for determining a measure of the interval between said "on" signal and said "off" signal; and
   recording means to record the output of said measuring means.

10. A converter as defined in claim 9 in which said drive means includes means for driving one said log at a speed different from that of another log.

11. An analogue to digital converter for use with analogue data represented on a strip of paper by a curve having different characteristics from the paper upon which it is placed, said curve being placed on said paper in relation to a base parallel to the depth axis, the combination which comprises:
   a drum having at least one elongated window;
   drive means for moving said curve past said window in a direction parallel to the axis of said drum;
   a scanning means for scanning said curve as it is driven past said window, said scanning means including means for generating an "on" and an "off" signal each time said scanning means encounters said base line and said curve respectively;
   measuring means for determining a measure of the interval between said "on" and said "off" signal; and
   recording means to record the output of said measuring means.

12. A converter as defined in claim 11 in which said scanning means includes a light beam generating means for generating a revolving light beam which revolves by said window.

13. An analog-to-digital converter for use with analogue data represented on a plurality of record mediums each having an analogue curve thereon of different characteristics from the record medium, there being a base line for each curve, the combination which comprises:
   support means for supporting said plurality of record mediums in a cylindrical pattern about an axis;
   drive means for moving each said record medium in a direction substantially parallel to said axis of said cylindrical pattern;
   scanning means capable of detecting said analogue curve and said base line, said scanning means being rotated about said axis of the cylindrical pattern of said support means, said scanning means including means for generating a first signal and a second signal each time said scanning means encounters each said base line and each said curve respectively;
   digital measuring means for obtaining a digital representation of the interval between said first signal and said second signal; and
   recording means for recording the digital representation of said digital measuring means.

14. An analogue to digital converter for use with analogue data represented on a record medium by a curve having different characteristics from the record medium upon which it is placed, said record medium having a base line thereon parallel to the depth axis, the combination which comprises:

first means for moving, at a first rate, one record medium having such analogue data thereon;

second means for simultaneously moving, at a different rate from said first rate, a second record medium having analogue data thereon;

scanning means for sequentially scanning corresponding levels of each of said analogue data, said plurality of record mediums each moving independently with respect to said scanning means, said scanning means including means for generating an "on" signal and an "off" signal each time said scanning means encounters each said base line and each said signal curve, respectively, on each said record medium;

digital measuring means for obtaining a digital representation of the interval between said "on" signal and said "off" signal; and recording means for recording the digital representation of said digital measuring means.